United States Patent
Watanabe et al.

[11] Patent Number: 5,929,599
[45] Date of Patent: Jul. 27, 1999

[54] INDUCTIVE COUPLING APPARATUS FOR CHARGING AN ELECTRIC CAR

[75] Inventors: Kunihiko Watanabe, Yokkaichi; Toshiro Shimada, Osaka, both of Japan

[73] Assignees: Sumitomo Wiring Systems, Ltd.; Sumitomo Electric Industries, Ltd., both of Japan

[21] Appl. No.: 09/033,794

[22] Filed: Mar. 3, 1998

[30] Foreign Application Priority Data

Mar. 10, 1997 [JP] Japan ................................. 9-054675

[51] Int. Cl.$^6$ .............................. H02J 7/00; H01F 27/08
[52] U.S. Cl. ............................. 320/108; 336/60; 336/196
[58] Field of Search .................................. 320/107, 108; 336/60, 185, 182, 196

[56] References Cited

U.S. PATENT DOCUMENTS 5,408,209   4/1995   Tanzer et al. ............................. 336/60
5,412,304   5/1995   Abbott ..................................... 320/108

*Primary Examiner*—Peter S. Wong
*Assistant Examiner*—Gregory J. Toatley
*Attorney, Agent, or Firm*—Jordan B. Bierman; Bierman, Muserlian and Lucas

[57] ABSTRACT

An inductive coupling apparatus charges a storage device in an electric car by means of an external power source apparatus. The inductive coupling apparatus includes a coil unit assembly comprising a primary coil unit (10) and a secondary coil unit (20). The primary and secondary coil units (10, 20) comprise primary and secondary coils (12, 22) and primary and secondary cores (11, 21) for supporting the respective coils (12, 22). Spacers (13, 23) are mounted on arms (11A, 21A) of the cores (11, 21) of the units (10, 20) so that the coils (12, 22) are spaced apart from the peripheral surfaces of the arms (11A, 21A), thereby forming gaps (11D, 21D) between the arms (11A, 21A) and the coils (12, 22) to flow a cooling medium such as air therebetween. When the coils (12, 22) radiate a heat upon charging, the cooling media which flow in the gaps (11D, 21D) absorb the heat from the cores (11, 21). This prevents the heat from being accumulated in spaces between the cores (11, 21) and the coils (12, 22) and suppresses the cores (11, 21) from a rise in temperature.

3 Claims, 5 Drawing Sheets

INDUCTIVE COUPLING APPARATUS FOR CHARGING AN ELECTRIC CAR

BACKGROUND OF THE INVENTION

This invention relates to an inductive coupling apparatus for charging an electric car.

In general, an inductive coupling apparatus includes a core assembly which constitutes a magnetic circuit for magnetically coupling a primary coil in a primary coil unit connected to an external power source apparatus to a secondary coil in a secondary coil unit connected to a power battery in the electric car. When the units are interconnected and the primary coil is energized, an induction electromotive force is generated in the secondary coil by a generated magnetic flux to charge the battery.

In such an inductive coupling apparatus, the core assembly generates heat due to a hysteresis loss of a magnetic material. A coil supporting portion of a core in the core assembly is apt to accumulate heat, since the coil covers the coil supporting portion. Consequently, there has been a problem in which the inductive coupling apparatus as a whole is subjected to a rise in temperature by a heat source emanating from the core upon charging the battery.

SUMMARY OF THE INVENTION

An object of the present invention is to provide an inductive coupling apparatus for charging an electric car which can suppress a rise in temperature.

In order to achieve the above object, in an inductive coupling apparatus for charging an electric car in accordance with the present invention, a storage device in the electric car is charged through the inductive coupling apparatus by means of an external power source apparatus, and the inductive coupling apparatus includes a coil unit assembly comprising a primary coil unit having a primary coil connected to the external power source apparatus and a primary core for supporting the primary coil, and a secondary coil unit having a secondary coil connected to the storage device and a secondary core for supporting the secondary coil, and the primary and secondary cores form a magnetic circuit between the primary and secondary coils. The inductive coupling apparatus is characterized in that a gap for flowing a cooling medium is formed between each of the primary and secondary coils and a coil supporting portion of each of the primary and secondary cores.

According to the above structure, heat radiated from the cores is absorbed by the cooling medium which flows in the gap defined between the coils and the coil supporting portions of the cores, thereby preventing heat from being accumulated in a space between the cores and coils and thereby suppressing the core from a rise in temperature.

In the inductive coupling apparatus for charging an electric car in accordance with the present invention, preferably, each of the primary and secondary cores may be provided on each of the coil supporting portions with a spacer adapted to defined the gap.

According to the above structure, the gaps between the cores and the coils can be surely defined by the spacers.

Also, in the inductive coupling apparatus for charging an electric car, each of said primary and secondary coils has reduced diameter portions adapted to be mounted on said coil supporting portion so as to define a gap for flowing a cooling medium.

According to the above structure, the reduced diameter portions serve as spacers for the other parts of the coils and the cores, whereby the gaps enable a ready flow of cooling media.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENTS

Figure 1:
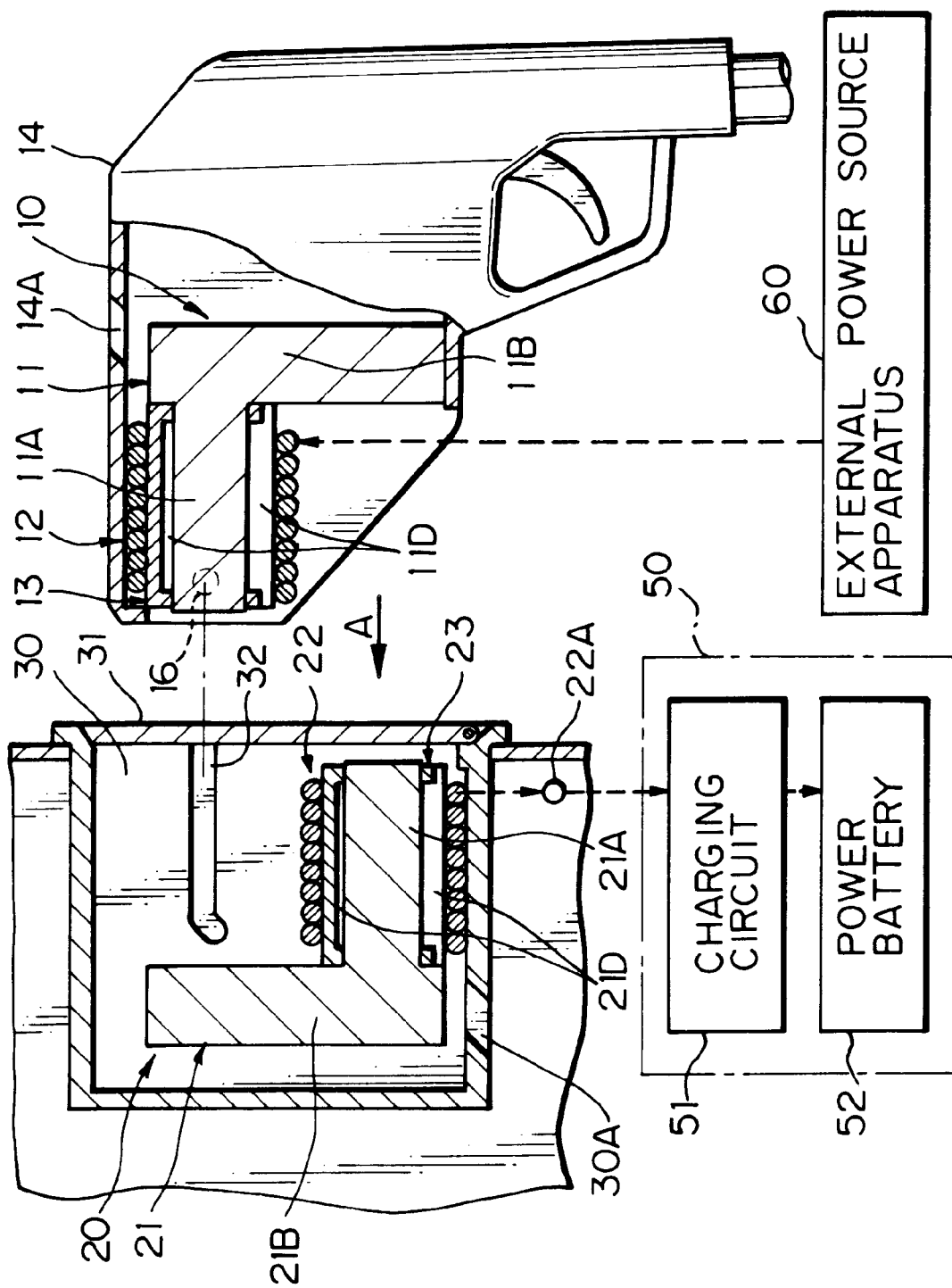
FIG. 1 is a fragmentary longitudinal sectional view of a first embodiment of an inductive coupling apparatus for charging an electric car in accordance with the present invention, illustrating the apparatus in a detached position.

Embodiments of an inductive coupling apparatus for charging an electric car in accordance with the present invention will be described below by referring to the drawings.

[First Embodiment]

A first embodiment of the inductive coupling apparatus will be described below by referring to FIGS. 1 to 3.

Figure 2:
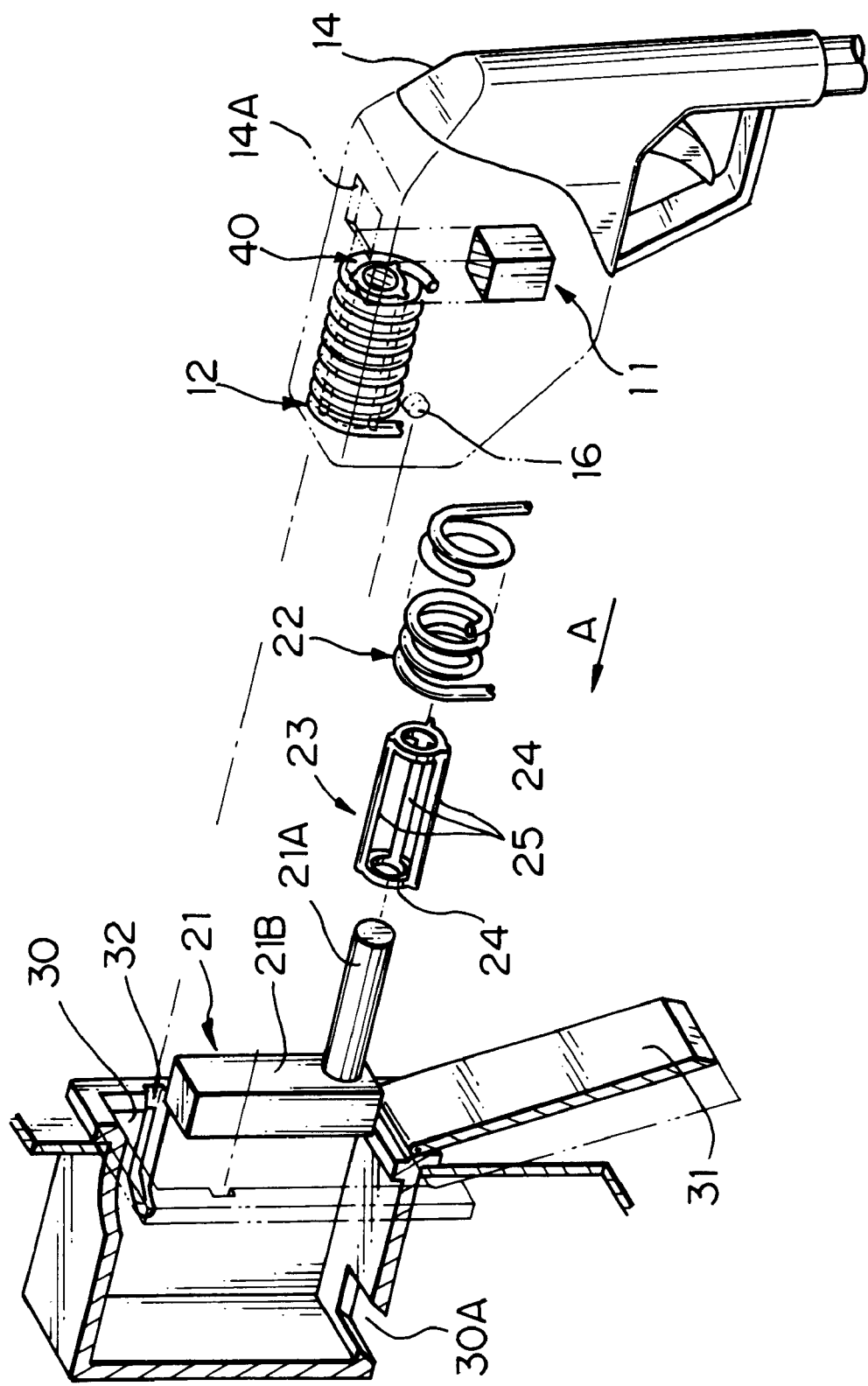
FIG. 2 is an exploded perspective view of the apparatus shown in FIG. 1, illustrating coil units.

As best shown in FIG. 2, an electric car has provided in a side of the car body a receiving part 30 which opens outwardly. A lid 31 is rotatably attached to an opening of the receiving part 30. When a primary coil unit 10 described hereinafter is inserted into the receiving part 30 along a direction shown by an arrow A, the primary coil unit 10 is coupled to the receiving part 30.

A secondary coil unit 20 includes a secondary core 21 produced by, for example, sintering a ferrite powder and a secondary coil 22 wound on the secondary core 21. An output terminal 22A of the secondary coil 22 is connected to a charging circuit 51 which charges a power battery 52 in a storage device 50 in the electric car by rectifying a high frequency electromotive force induced in the secondary coil 22.

The secondary core 21 has an L-shape in side view in FIG. 1. The secondary core 21 has an arm 21A with a circle in cross section and a post 21B with a rectangle in cross section, as shown in FIG. 2. The arm 21A extends along the attaching direction A and the post 21B extends from the arm 21A perpendicularly. A distal end surface (coupling surface) of the arm 21A intersects perpendicularly the attaching direction A of the primary coil unit 10. A side surface (coupling surface) of the post 21B also intersects perpendicularly the attaching direction A.

A spacer 23 made of an insulative material, for example, a heat resistance synthetic resin is mounted on the arm 21A. For example, as shown in FIG. 2, the spacer 23 is provided on the opposite ends with each of a pair of rings 24 and 24 adapted to be fitted on the arm 21A. The pair of rings 24, 24 are connected to each other by three bars 25 which are arranged at trisected positions on a peripheral direction of the rings 24.

The secondary coil 22 is formed by winding a litz wire in a single layer and a plurality of turns. The secondary coil 22 is mounted on the arm 21A through the spacer 23 to cover the outer peripheral surface of the arm 21A. Consequently, a gap 21D (see FIG. 1) according to the present invention is defined between the secondary coil 22 and the arm 21A, whereby a cooling medium such as air can flow freely through the gap 21D. The receiving part 30 is provided in the inner side of a lower wall with an opening 30A which is communicated with the exterior of the receiving part 30 so as to flow the cooling medium or air through the opening 30A into and out of the receiving part 30.

On the other hand, the primary coil unit 10 comprises a primary core 11 and a primary coil 12, and is contained in a connector housing 14. The primary core 11 has the same configuration as that of the secondary core 21. The primary core 11 includes an arm 11A with a circle in cross section and a post 11B with a rectangle in cross section. The arm 11A extends in a longitudinal direction of the connector housing 14 (in the attaching direction A of the primary coil unit 10) while the post 11B extends from the arm 11A perpendicularly and is secured to the connector housing 14. A distal end surface (coupling surface) of the arm 11A of the primary core 11 intersects the attaching direction A perpendicularly while a side surface (coupling surface) of the post 11B also intersects the attaching direction A perpendicularly.

A spacer 13 which has the same configuration as that of the spacer 23 described above is mounted on the arm 11A. The primary coil 12 is formed by winding a litz wire in a single layer and a plurality of turns by the same manner as the secondary coil 22 mentioned above. The primary coil 12 is mounted through the spacer 13 on the arm 11A of the primary core 11 so as to cover an outer peripheral surface of the arm 11A by the same manner as the secondary coil unit 20. Consequently, a gap 11D (see FIG. 1) according to the present invention is defined between the primary coil 12 and the arm 11A, whereby a cooling medium such as air can flow freely through the gap 11D. The inner side of an upper wall of the connector housing 14 has an opening 14A which is communicated with the exterior of the connector housing 14 so as to flow the cooling medium or air through the opening 14A into and out of the connector housing 14.

The connector housing 14 is provided on the front side of each of the opposite side walls with a guide projection 16 while the receiving part 30 is provided in each of the inner opposite surfaces with a guide groove 32 corresponding to the guide projection 16. The guide projections 16 and guide grooves 32 serve to guide the connector housing 14 to a regular position in the receiving part 30. The primary coil unit 10 is provided with a lock mechanism (not shown) which serves to mechanically lock the unit 10 in the part 30, thereby preventing the primary coil unit 10 from accidentally falling out of the receiving part 30 upon attachment.

Next, an operation of the first embodiment will be explained below.

The lid 31 is opened from the receiving part 30 in the car body of the electric car and an end of the connector housing 14 is inserted through the opening into the receiving part 30. Then, as shown in FIG. 3, the distal end surface of the arm 11A of the primary core 11 comes into contact with the side surface of the post 21B of the secondary core 21 while the distal end surface of the arm 21A of the secondary core 21 also comes into contact with the side surface of the post 11B of the primary core 11, whereby the cores 11 and 21 form a magnetic circuit in a rectangular closed loop.

When the primary coil 12 is energized by the external power source apparatus 60, a generated magnetic flux passes through the cores 11 and 21, an induction electromotive force is generated in the primary coil 12 by means of magnetic induction, and a power battery 52 in the electric car is charged.

While charging the battery, a large magnetic flux is generated in the cores 11 and 21, so that the cores 11 and 21 radiate heat. However, since the gaps 11D and 21D are defined between the arms 11A, 21A of the cores 11 and 21, which are covered with the coils 12, 22 and the coils 12, 22 by means of the spacers 13, 23, the cooling media or air which pass through the gaps 11D and 21D can absorb the heat from the cores 11 and 21. The heated light air flows out from the opposite ends of the gaps 11D and 21D and eventually flows into the exterior of the connector housing 14 through the upper opening 14A. At the same time, a cool heavy air flows into the receiving part 30 through the lower opening 30A, whereby a natural convection of air will be caused from a left lower position in FIG. 3 to a right upper position in the connector housing 14 and the receiving part 30 as a whole.

Figure 3:
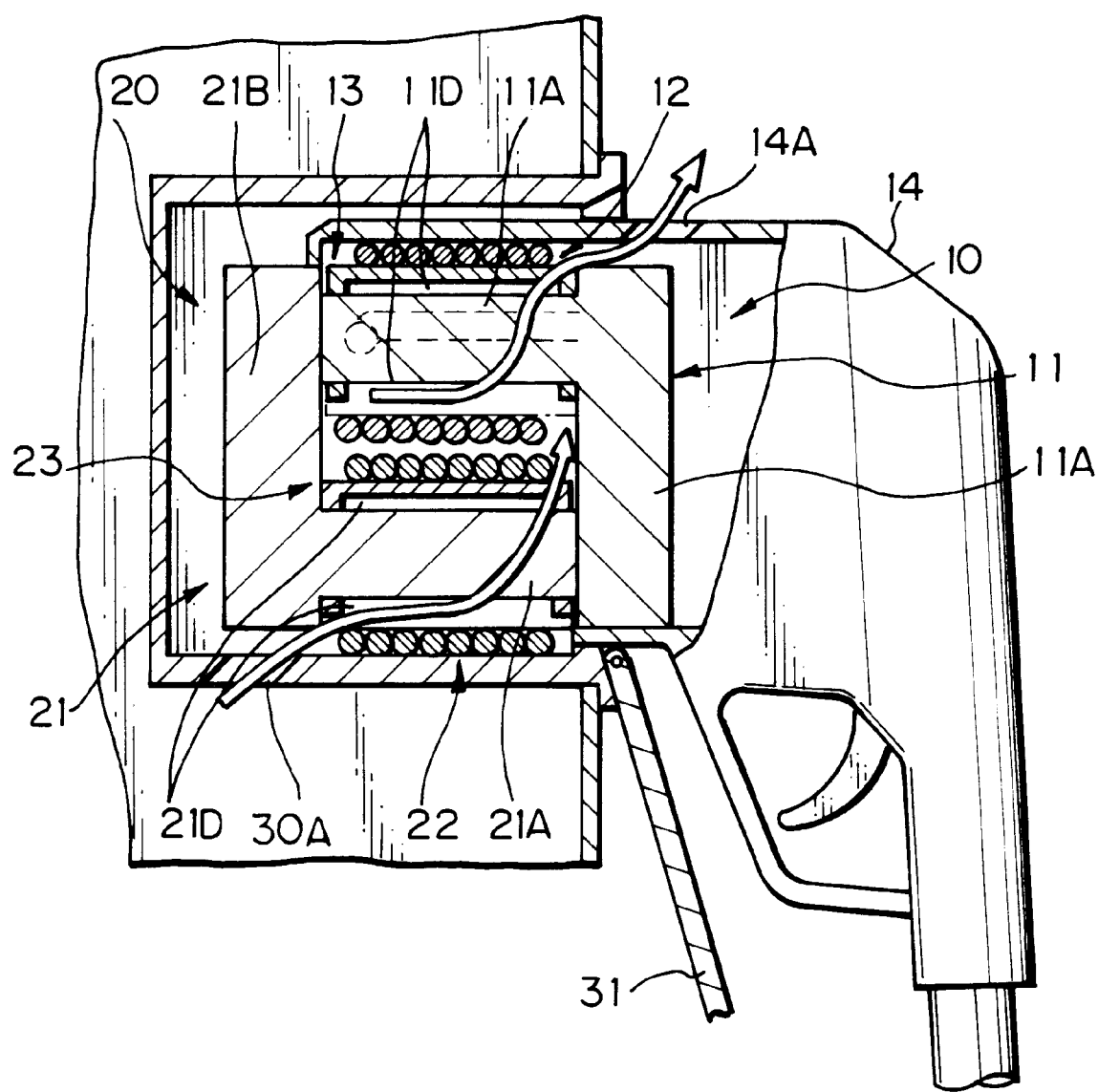
FIG. 3 is a fragmentary longitudinal sectional view of the apparatus shown in FIG. 1, illustrating the apparatus in a coupled position.

Thus, the air flows from a right lower position in FIG. 3 to a left upper position through the gaps 11D and 21D, thereby preventing the heat from being accumulated in spaces between the cores 11, 21 and coils 12, 22 and suppressing the cores 11 and 21 from rising a temperature. Even if an external force is applied to the coil 12 or 22, the gap 11D or 21D will not collapse, thereby steadily flowing the cooling medium or air through the gap, since the spacers 13 and 23 are disposed between the coils 12, 22 and the cores 11, 21.

Thus, according to the first embodiment, it is possible to absorb the heat stored in the space between the coils and the cores even if the cores emanate heat and to prevent the cores from rising a temperature.

[Second Embodiment]

Figure 4:
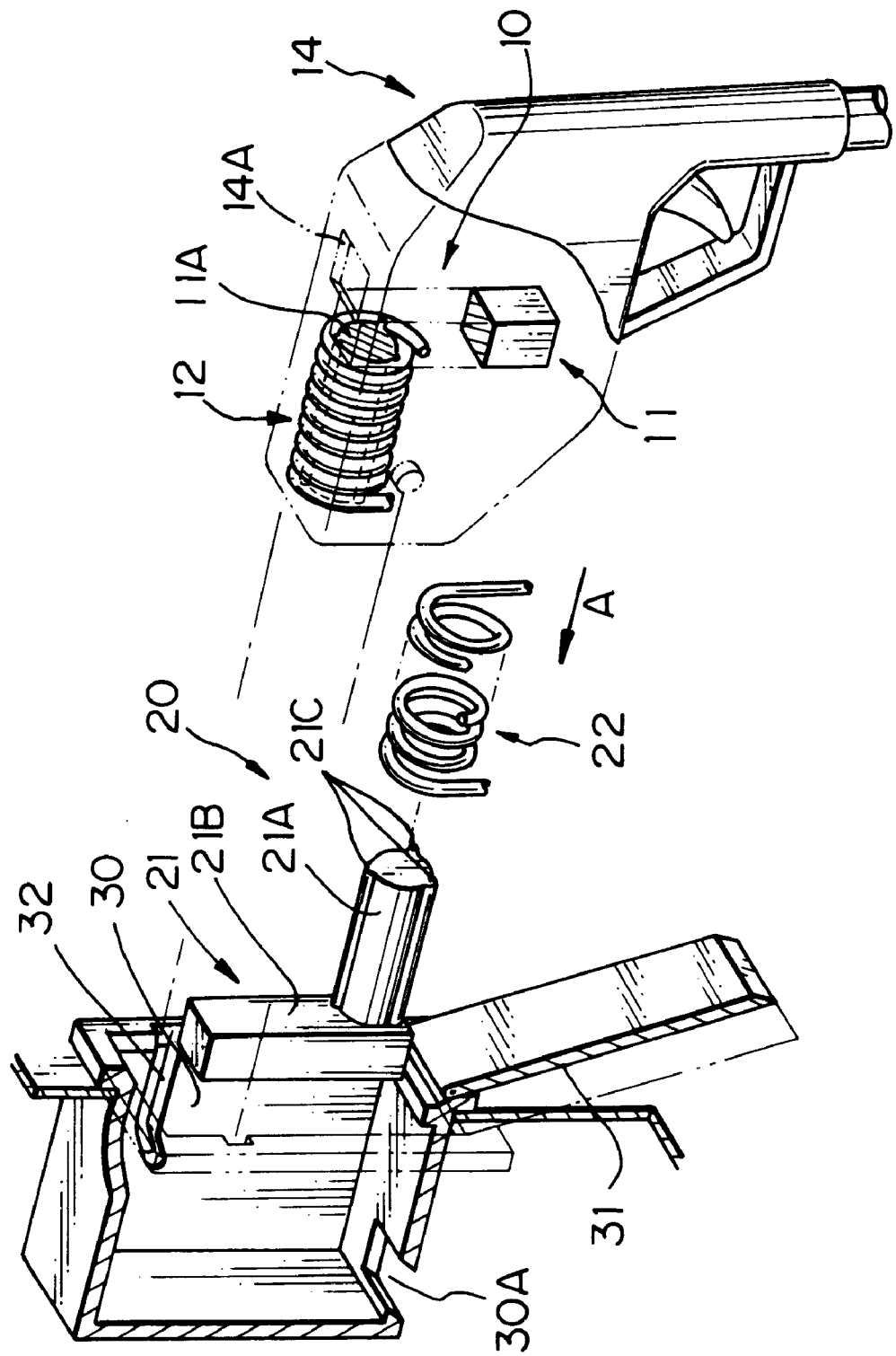
FIG. 4 is an exploded perspective view similar to FIG. 2, illustrating a second embodiment of the apparatus in accordance with the present invention.

FIG. 4 shows a second embodiment of an inductive coupling apparatus for charging an electric car in accordance with the present invention. Although the spacers 13 and 23 are different parts from the cores 11 and 21 in the above first embodiment, spacer means are integrated together with the cores 11 and 21 in the second embodiment. As shown in FIG. 4, in the second embodiment the arm 21A of the primary core 21 has three ridges 21C each of which extends longitudinally on the outer peripheral surface of the arm 21A and is arranged at a trisected position in the peripheral direction of the arm 21A. The primary core 11 has the same structure as that of the secondary core 21. To avoid duplication, the other structures in the second embodiment are indicated by the same signs as those in the first embodiment and explanation thereof is thus omitted here.

According to the second embodiment, it is possible to reduce the number of parts in addition to achievement of the same operational effect as that of the first embodiment.

[Other Embodiments]

Figure 5:
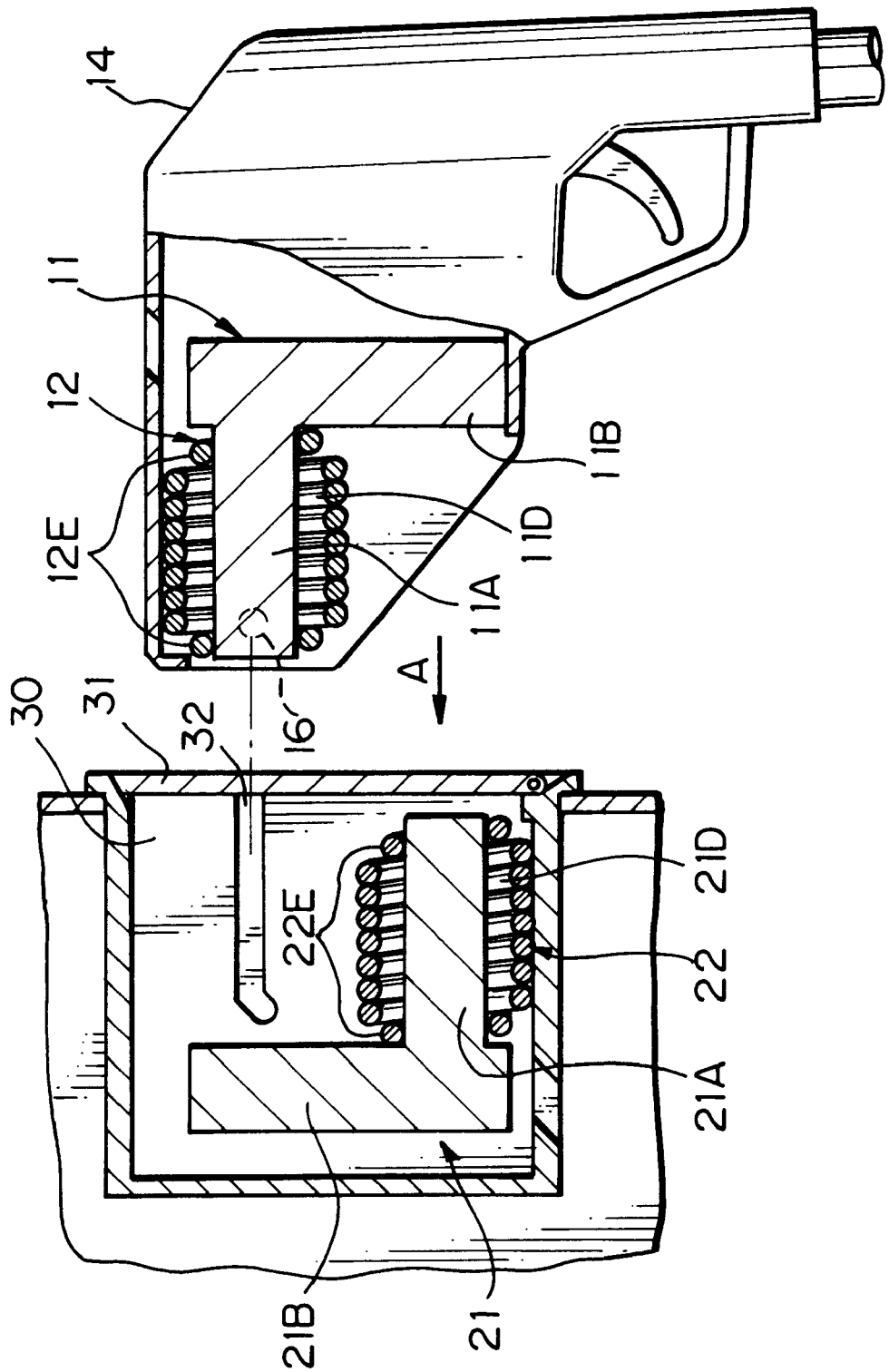
FIG. 5 is a fragmentary longitudinal sectional view similar to FIG. 1, illustrating a third embodiment of the apparatus in accordance with the present invention.

It should be noted that the present invention is not limited to the embodiments described above and, for example, alterations described below are contained in the technical scope of the present invention. Further, the present invention can be carried out in various alterations, without deviating from the gist of the present invention, including the following alterations:

(1) Although the spacer means (spacers 13, 23 or ridges 21c) are provided as separate parts or integrated parts for the cores in the first and second embodiments, any gaps may be defined between the cores and the coils without providing the spacer means. For example, the coils 12, 22 which are formed by winding the litz wire in a single layer and a plurality of turns in the first embodiment may be provided on each of their opposite ends with a single turn (12E or 22E in FIG. 5) having a smaller diameter than the other turns so that the single turn fits on each of the arms 11A and 21A of the cores 11 and 21 and the other turns are spaced apart from the arms 11A and 21A to define the gaps 11D and 21D.

(2) The coils and cores may be attached to the housings without fixing the coils on the cores directly and then they are positioned with respect to each other. This can define gaps between the coils and the cores.

(3) Although the primary and secondary cores have the L-shapes in side view in the first and second embodiments, the shapes of the cores should not be limited to the L-shapes.

(4) Although the primary and secondary coils are formed of the litz wires in the first and second embodiments, the coils may be formed of another material. For example, a conductive pipe is wound in a plurality of turns to form a coil and a cooling water may be flowed into the coiled pipe to cool the coil itself.

From the above description of the invention, those skilled in the art will perceive improvements, changes and modifications. Such improvements, changes and modifications within the skill of the art are intended to be covered by the appended claims.

The entire disclosure of Japanese Patent Application No. HEI 9-54675 (1997) filed on Mar. 10, 1997 including specification, claims, drawings and summary is incorporated herein by reference in its entirety.

What is claimed is:

1. An inductive coupling apparatus for charging an electric car, wherein a storage device in the electric car is charged through said inductive coupling apparatus by means of an external power source apparatus, wherein said inductive coupling apparatus includes a coil unit assembly comprising a primary coil unit having a primary coil connected to said external power source apparatus and a primary core for supporting said primary coil, and a secondary coil unit having a secondary coil connected to said storage device and a secondary core for supporting said secondary coil, and wherein said primary and secondary cores form a magnetic circuit between said primary and secondary coils;

said inductive coupling apparatus being characterized in that a gap for flowing a cooling medium is formed between each of said primary and secondary coils and a coil supporting portion of each of said primary and secondary cores.

2. An inductive coupling apparatus for charging an electric car, according to claim 1, wherein each of said primary and secondary cores is provided on each of said coil supporting portions with a spacer adapted to define said gap.

3. An inductive coupling apparatus for charging an electric car, according to claim 1, wherein each of said primary and secondary coils has reduced diameter portions adapted to be mounted on said coil support portion so as to define a gap for flowing a cooling medium.

* * * * *